United States Patent
Patil et al.

(10) Patent No.: US 8,897,148 B2
(45) Date of Patent: Nov. 25, 2014

(54) METHODS AND APPARATUS FOR RESOURCE ALLOCATION FOR PEER-TO-PEER DATA IN NON PEER-TO-PEER RESOURCES

(75) Inventors: Shailesh Patil, Bridgewater, NJ (US); Hua Wang, Bridgewater, NJ (US); Xinzhou Wu, Monmouth Junction, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 976 days.

(21) Appl. No.: 12/898,906

(22) Filed: Oct. 6, 2010

(65) Prior Publication Data
US 2012/0087253 A1 Apr. 12, 2012

(51) Int. Cl.
*H04L 12/26* (2006.01)
*H04W 72/08* (2009.01)
*H04W 72/12* (2009.01)
*H04W 76/02* (2009.01)

(52) U.S. Cl.
CPC ........ *H04W 72/085* (2013.01); *H04W 72/1231* (2013.01); *H04W 76/023* (2013.01)
USPC ........................................ 370/252

(58) Field of Classification Search
None
See application file for complete search history.

(56) References Cited

U.S. PATENT DOCUMENTS

| 8,208,459 B2 | 6/2012 | Horn et al. |
| 2004/0240565 A1 | 12/2004 | Santhoff et al. |
| 2006/0159003 A1 | 7/2006 | Nanda et al. |
| 2006/0160544 A1 | 7/2006 | Sun et al. |
| 2008/0250408 A1 | 10/2008 | Tsui et al. |
| 2009/0016363 A1 | 1/2009 | Laroia et al. |
| 2009/0232142 A1* | 9/2009 | Li et al. ............. 370/395.3 |
| 2009/0252134 A1 | 10/2009 | Schlicht et al. |
| 2010/0169498 A1 | 7/2010 | Palanki et al. |
| 2010/0189046 A1* | 7/2010 | Baker et al. ............. 370/329 |
| 2012/0077510 A1* | 3/2012 | Chen et al. .............. 455/452.1 |
| 2012/0093098 A1* | 4/2012 | Charbit et al. ........... 370/329 |
| 2012/0322484 A1* | 12/2012 | Yu et al. .................. 455/509 |

FOREIGN PATENT DOCUMENTS

WO 2009009572 A2 1/2009

OTHER PUBLICATIONS

International Search Report and Written Opinion—PCT/US2011/054813—ISA/EPO—Dec. 23, 2011.
Xing, H et al., "The investigation of power control schemes for a device-to-device communication integrated into OFDMA cellular system", Personal Indoor and Mobile Radio Communications (PIMRC), 2010 IEEE 21ST International Symposium on, IEEE, Piscataway, NJ, USA, Sep. 26, 2010, pp. 1775-1780, XP031837914, ISBN: 978-1-4244-8017-3 the whole document.

* cited by examiner

*Primary Examiner* — Rhonda Murphy
(74) *Attorney, Agent, or Firm* — James K. O'Hare

(57) ABSTRACT

A method of operating a wireless device includes communicating in one of peer-to-peer data resources or non peer-to-peer resources. The peer-to-peer data resources include a first set of peer-to-peer resources with a first bandwidth and a second set of peer-to-peer resources with a second bandwidth greater than the first bandwidth. The first set of peer-to-peer resources is parallel in time with the non peer-to-peer resources. In addition, the method includes estimating a signal quality for a data transmission on the peer-to-peer data resources. Furthermore, the method includes determining whether to send the data transmission in one of the first set of peer-to-peer resources or the second set of peer-to-peer resources based on the estimated signal quality.

44 Claims, 14 Drawing Sheets

METHODS AND APPARATUS FOR RESOURCE ALLOCATION FOR PEER-TO-PEER DATA IN NON PEER-TO-PEER RESOURCES

BACKGROUND

1. Field

The present disclosure relates generally to communication systems, and more particularly, to resource allocation for peer-to-peer data in non peer-to-peer resources such as resources for wireless wide area network (WWAN) communication.

2. Background

In WWAN communication, communication between wireless devices and a serving base station are through uplink (UL) and downlink (DL) channels. In order to reduce a load on the serving base station, two wireless devices in communication with each other through the serving base station may communicate directly using peer-to-peer communication rather than communicate through the serving base station. Time/frequency resources may be dedicated for each of WWAN and peer-to-peer communication. There is a need for improving the efficiency of concurrent WWAN and peer-to-peer communication in order to better utilize the available resources.

SUMMARY

In an aspect of the disclosure, a method of operating a wireless device includes communicating in one of peer-to-peer data resources or non peer-to-peer resources. The peer-to-peer data resources include a first set of peer-to-peer resources with a first bandwidth and a second set of peer-to-peer resources with a second bandwidth greater than the first bandwidth. The first set of peer-to-peer resources is parallel in time with the non peer-to-peer resources. In addition, the method includes estimating a signal quality for a data transmission on the peer-to-peer data resources. Furthermore, the method includes determining whether to send the data transmission in one of the first set of peer-to-peer resources or the second set of peer-to-peer resources based on the estimated signal quality.

In an aspect of the disclosure, a method of wireless communication includes determining a partitioning of peer-to-peer data resources and non peer-to-peer resources. The peer-to-peer data resources include a first set of peer-to-peer resources with a first bandwidth and a second set of peer-to-peer resources with a second bandwidth greater than the first bandwidth. The first set of peer-to-peer resources and the non peer-to-peer resources are parallel in time. In addition, the method includes communicating the partitioning of the peer-to-peer data resources and the non peer-to-peer resources.

DETAILED DESCRIPTION

Figure 1:
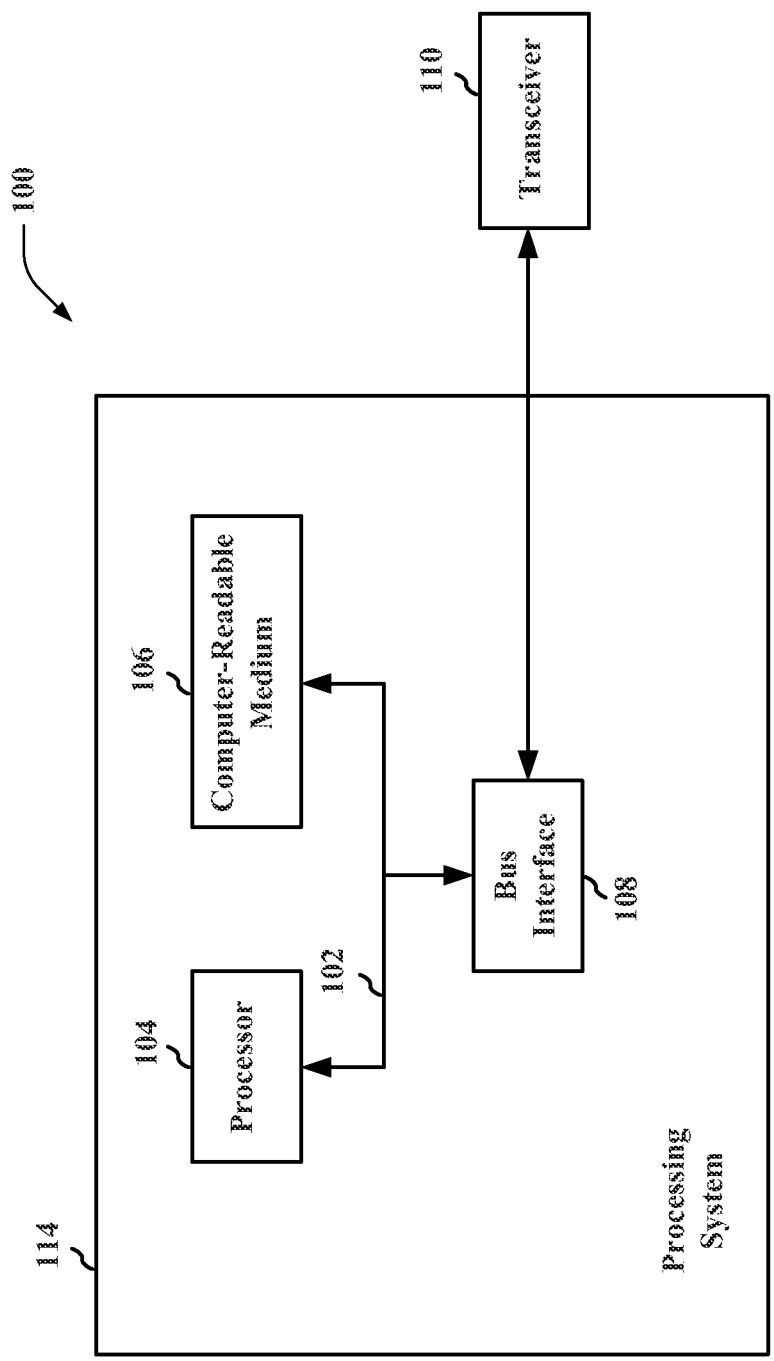
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
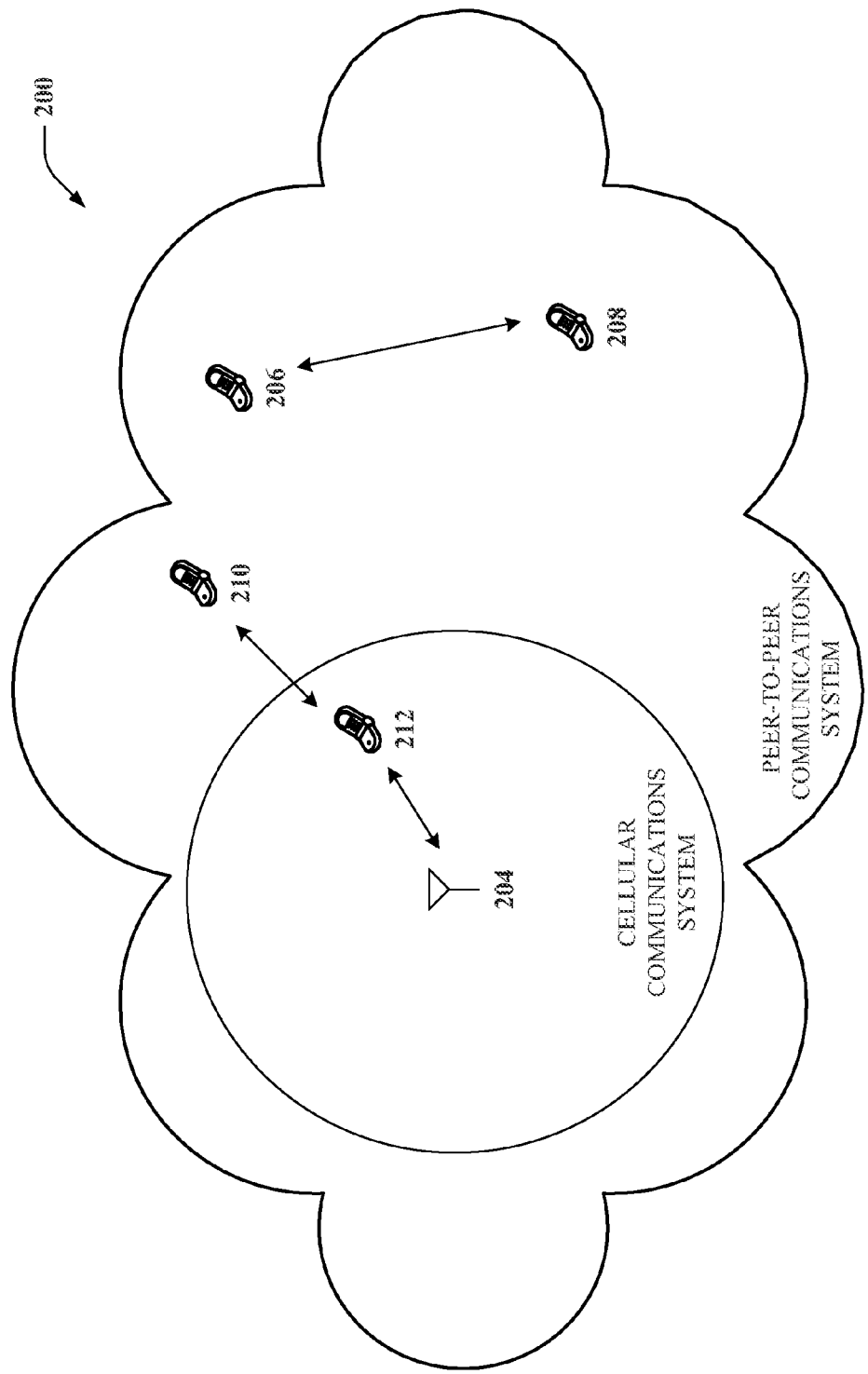
FIG. 2 is a drawing of a wireless peer-to-peer communications system.

FIG. 2 is a drawing of an exemplary peer-to-peer communications system 200.

The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology.

The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
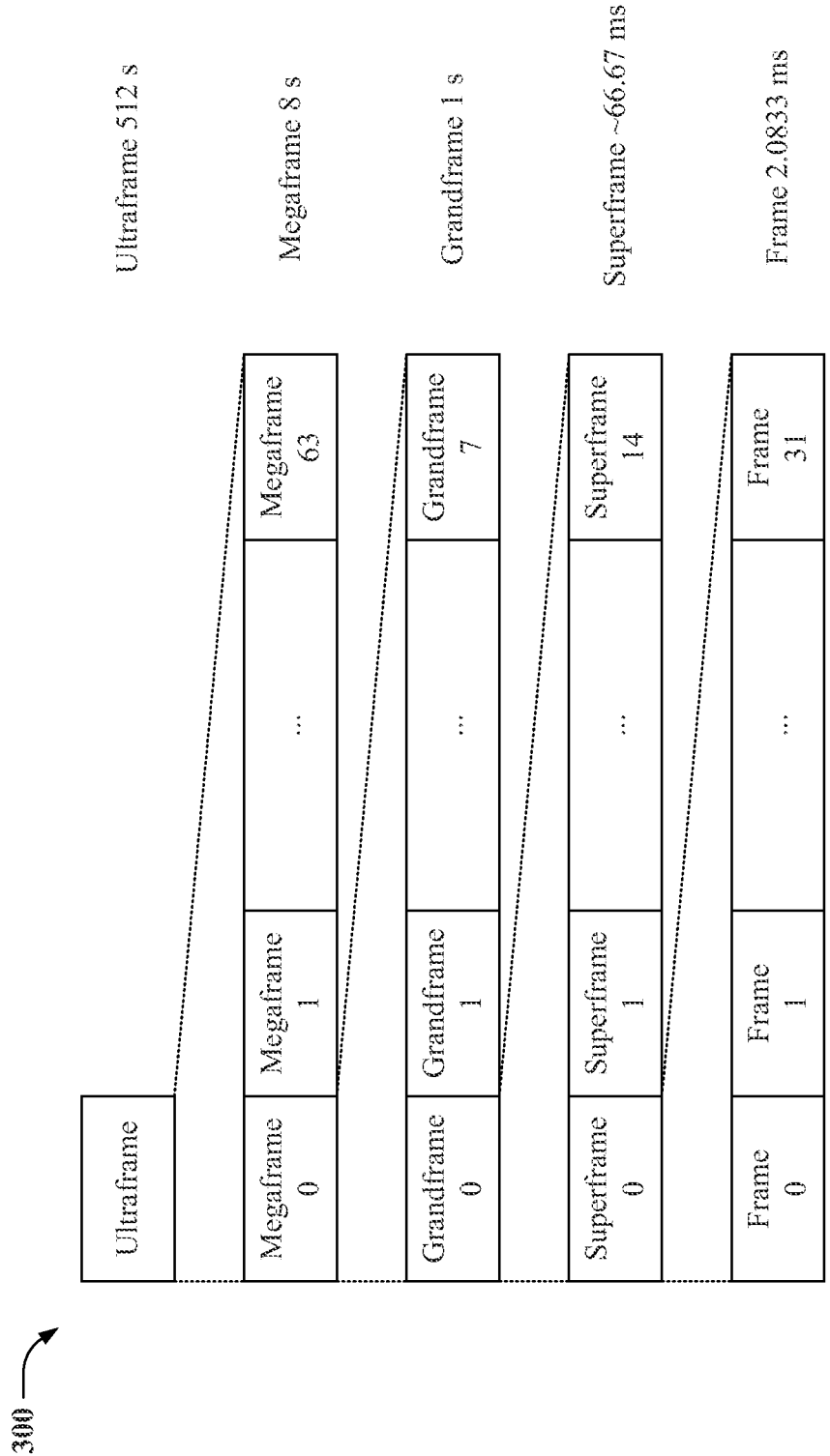
FIG. 3 is a diagram illustrating a time structure for peer-to-peer communication between the wireless devices.

FIG. 3 is a diagram 300 illustrating a time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
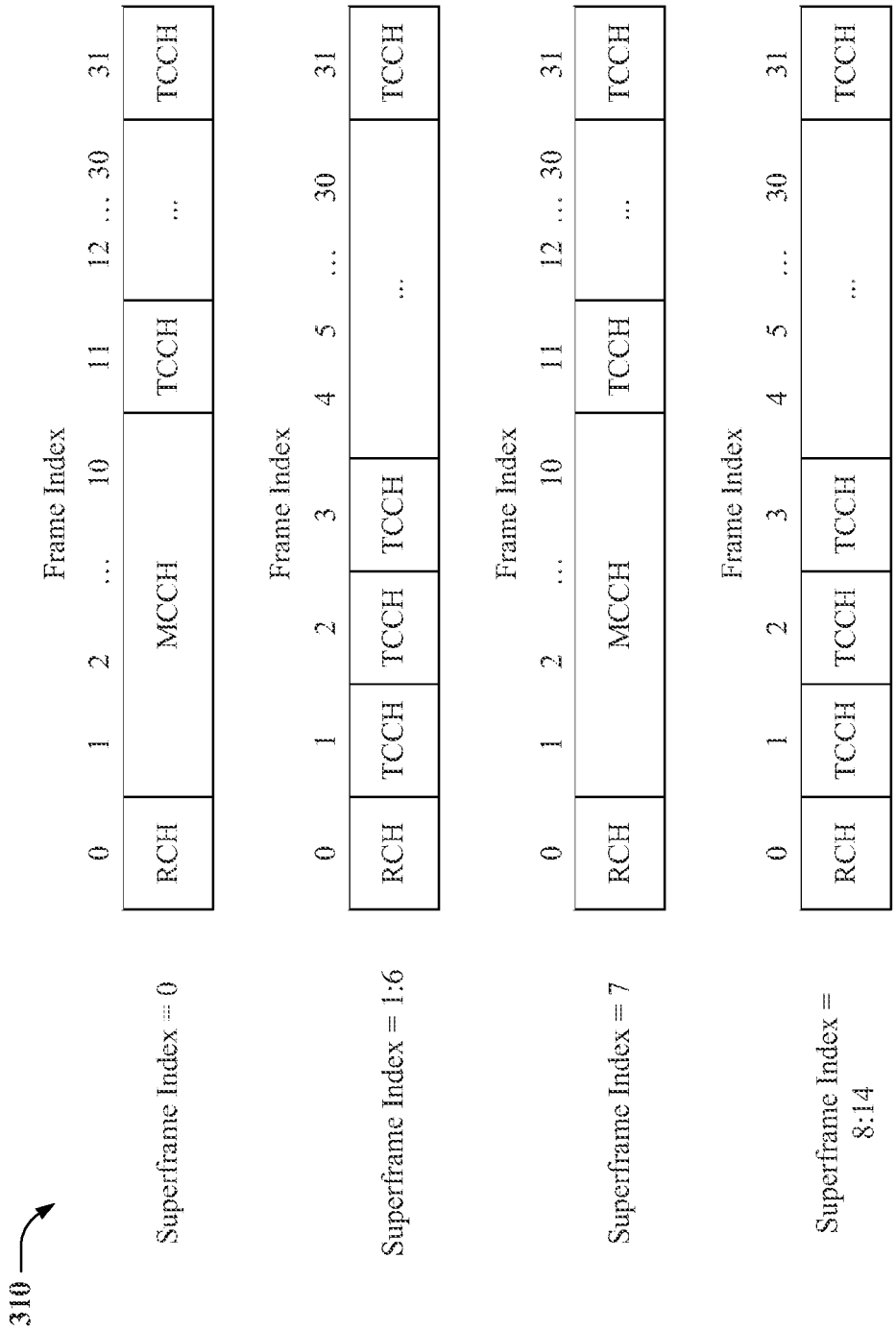
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
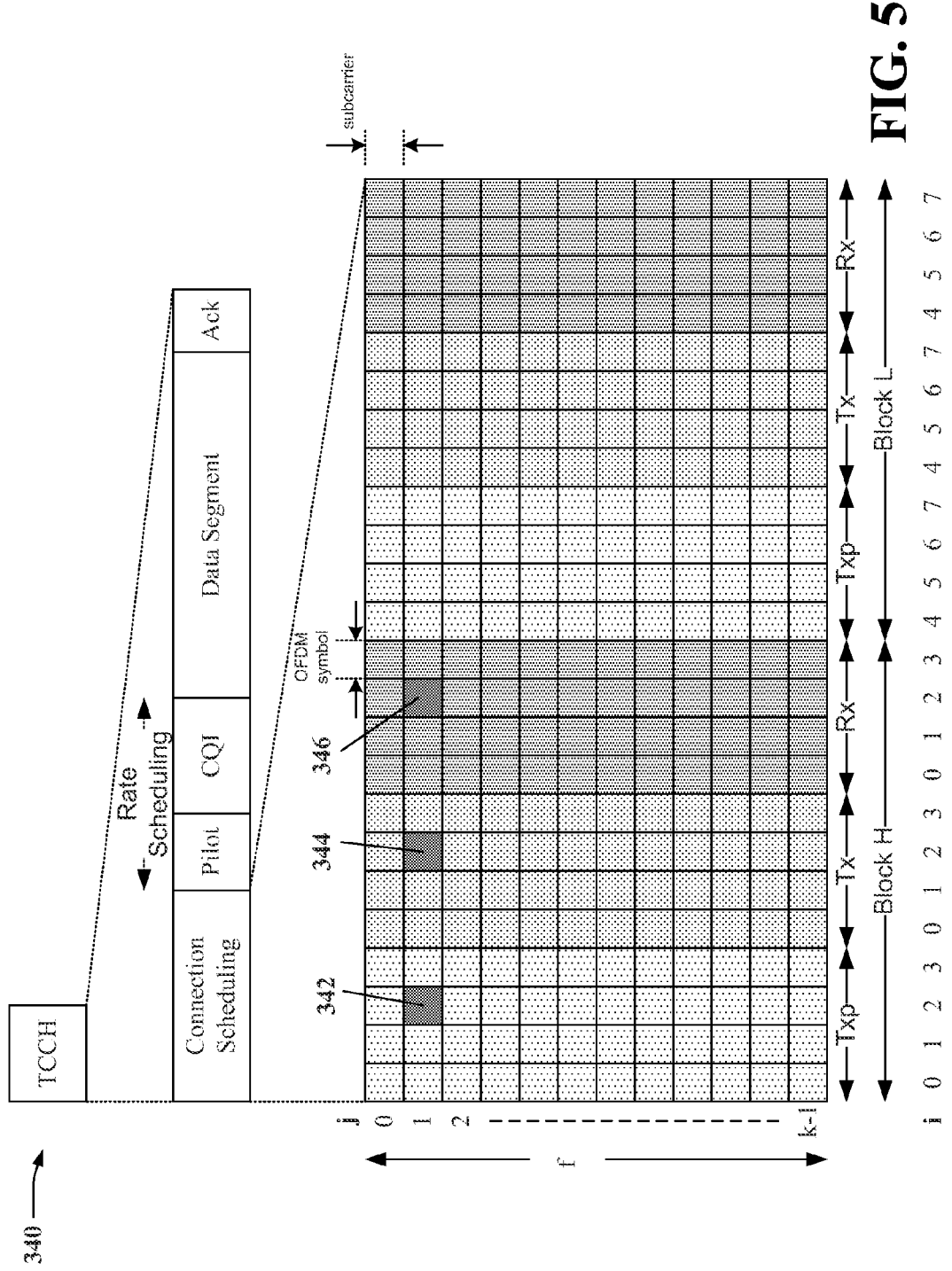
FIG. 5 is a diagram illustrating an operation timeline of a traffic channel slot and a structure of connection scheduling.

FIG. 5 is a diagram 340 illustrating an operation timeline of a TCCH slot and a structure of connection scheduling. As shown in FIG. 5, a TCCH slot includes four subchannels: connection scheduling, rate scheduling, data segment, and ACK. The rate scheduling subchannel includes a pilot segment and a CQI segment. The ACK subchannel is for transmitting an ACK or negative acknowledgement (NACK) in response to data received in the data segment subchannel. The connection scheduling subchannel includes two blocks, a higher priority Block H and a lower priority Block L. Each of Block H and Block L contains a plurality of resource elements, i.e., a plurality of subcarriers in the frequency domain and OFDM symbols in the time domain. Each of Block H and Block L spans the plurality of subcarriers and includes four OFDM symbols in a Txp-block, four OFDM symbols in a Tx-block, and four OFDM symbols in an Rx-block. One resource element (or tone) corresponds to one subcarrier and one OFDM symbol.

Each link has a connection identifier (CID). Based on the CID, for a particular TCCH slot, wireless devices in a link are allocated a resource element in the same respective OFDM symbol position in each of the Txp-block, the Tx-block, and the Rx-block at a particular subcarrier and within Block H or Block L. For example, in a particular TCCH slot, a link with CID=4 may be allocated the resource element 342 in the Txp-block of Block H, the resource element 344 in the Tx-block of Block H, and the resource element 346 in the Rx-block of Block H for transmitting/receiving a scheduling control signal. A transmit request signal in the Tx-block is transmitted with a power equal to a power for transmitting the data segment. A transmit request response signal in the Rx-block is transmitted with a power proportional to an inverse of the power of the received transmit request signal. The allocated trio of resource elements for the Txp-block, Tx-block, and Rx-block vary with respect to the subcarrier (e.g., k different subcarriers) and the respective OFDM symbol in each TCCH slot (e.g., 8 different OFDM symbols—4 in the Block H and 4 in the Block L).

The trio of resource elements allocated to a link dictates the medium access priority of the link. For example, the trio of resource elements 342, 344, 346 corresponds to i=2 and j=1. The medium access priority is equal to ki+j+1, where i is the respective OFDM symbol in each of the Txp, Tx, and Rx subblocks, j is the subcarrier, and k is the number of subcarriers. Accordingly, assuming k=28, the resource elements 342, 344, 346 correspond to a medium access priority of 58.

Figure 6:
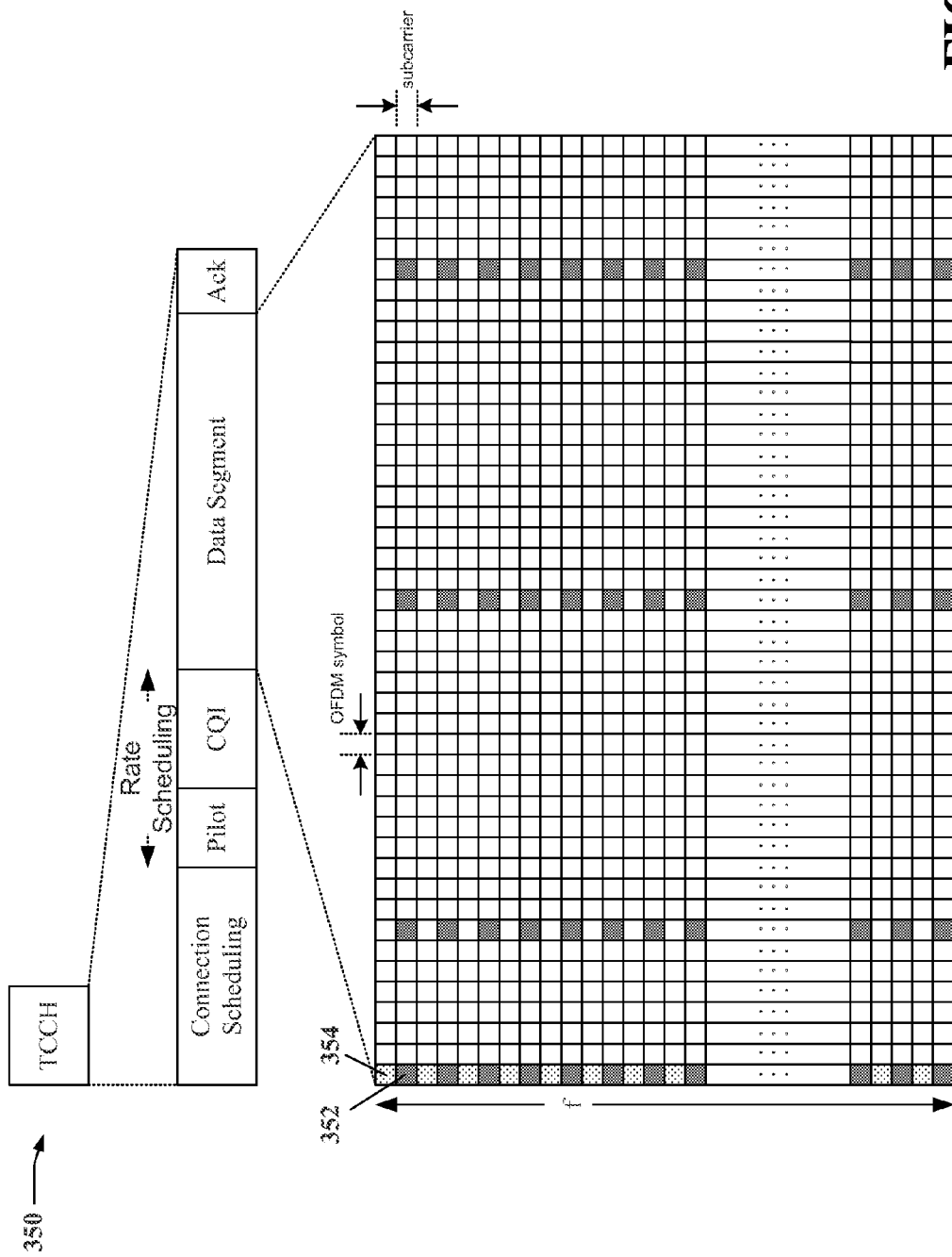
FIG. 6 is a diagram illustrating a structure of a data segment.

FIG. 6 is a diagram 350 illustrating a structure of the data segment. The data segment contains a plurality of resource elements spanning a plurality of subcarriers in the frequency domain and OFDM symbols in the time domain. Some of the resource elements in the data segment, such as resource element 354, may carry rate indicator information regarding the coding and/or modulation used for the data segment. Other resource elements in the data segment, such as resource element 352, may carry a pilot to allow for estimating the channel for demodulation and decoding.

Figure 7:
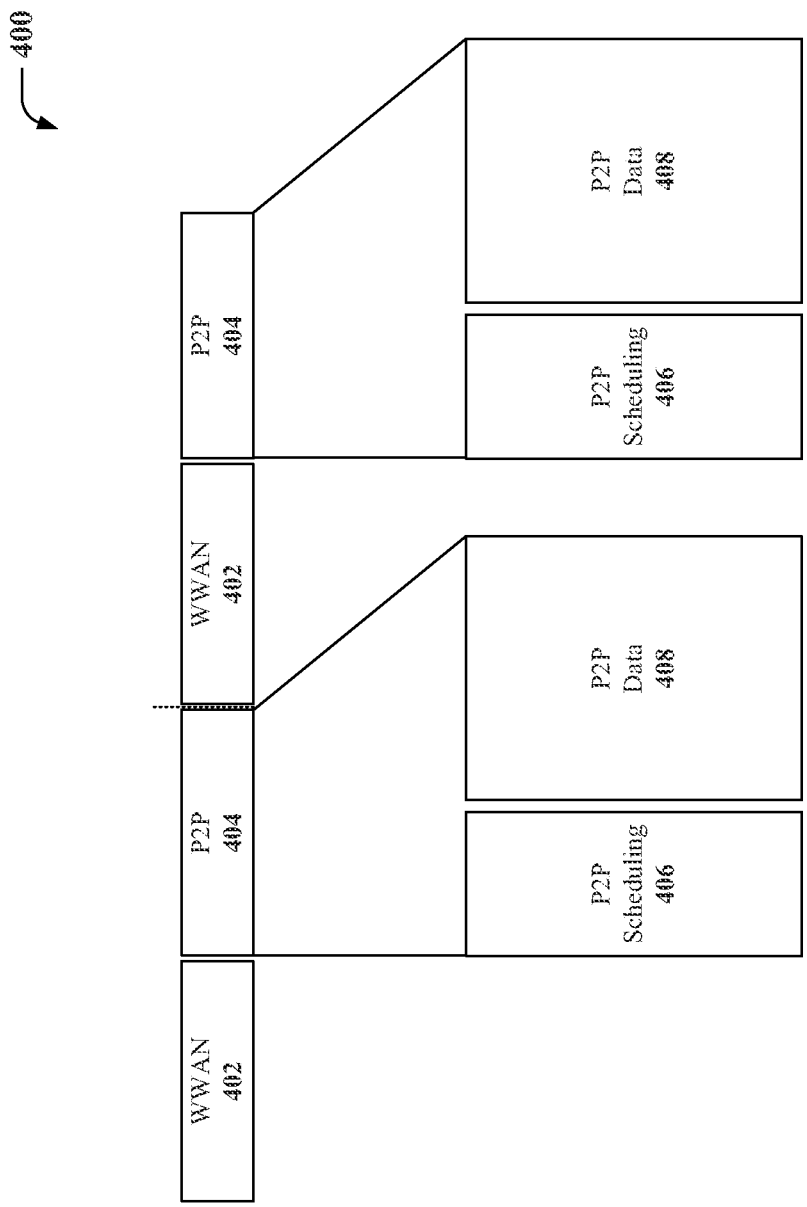
FIG. 7 is a diagram illustrating resources split between WWAN and peer-to-peer resources.

FIG. 7 is a diagram illustrating resources split between WWAN and peer-to-peer resources. Scheduling of peer-to-peer communication can be complicated because a reasonable scheduling algorithm would need to take into account multiple factors such as the links that want to be scheduled, which wireless device in a particular link is the data source and which is the data destination, the direct link signal strength between the source and the destination on a peer-to-peer link, the amount of interference a peer-to-peer link can cause to another peer-to-peer link, the amount of interference that a peer-to-peer link will experience when it is scheduled, and the relative priorities of links that want to be scheduled.

Many of these factors are localized. To enable peer-to-peer traffic in WWAN, the cost of periodically feeding back all the above factors to the base station can be prohibitively large. As such, an efficient use of resources is to allow links to make scheduling decisions while the base station applies centralized control at a slower time scale. As shown in FIG. 7, peer-to-peer communication in a WWAN may be enabled by periodically allocating peer-to-peer resources 404 that are orthogonal to the WWAN resources 402. The peer-to-peer resources 404 may include peer-to-peer scheduling resources 406 (e.g., connection scheduling resources as discussed supra with respect to FIG. 5) used for distributed scheduling and peer-to-peer data traffic resources 408 (e.g., data segment resources as discussed supra with respect to FIG. 6).

For any peer-to-peer link, the data transmission rate R is a function of the bandwidth B of the data transmission and the signal to noise ratio (SNR): $R=B\log_2(1+SNR)$. For small SNR (e.g., for long links), $R \approx B*SNR$. The SNR is equal to $P/n_0 B$, where P is the received power and $n_0$ the noise. As such, for small SNR, $R \approx P/n_0$. Accordingly, for small SNR, with fixed power P, increasing the bandwidth B to increase the data transmission rate R provides only minimal gains. The bandwidth B therefore may be more efficiently utilized for non peer-to-peer communication such as for WWAN communication.

Figure 8:
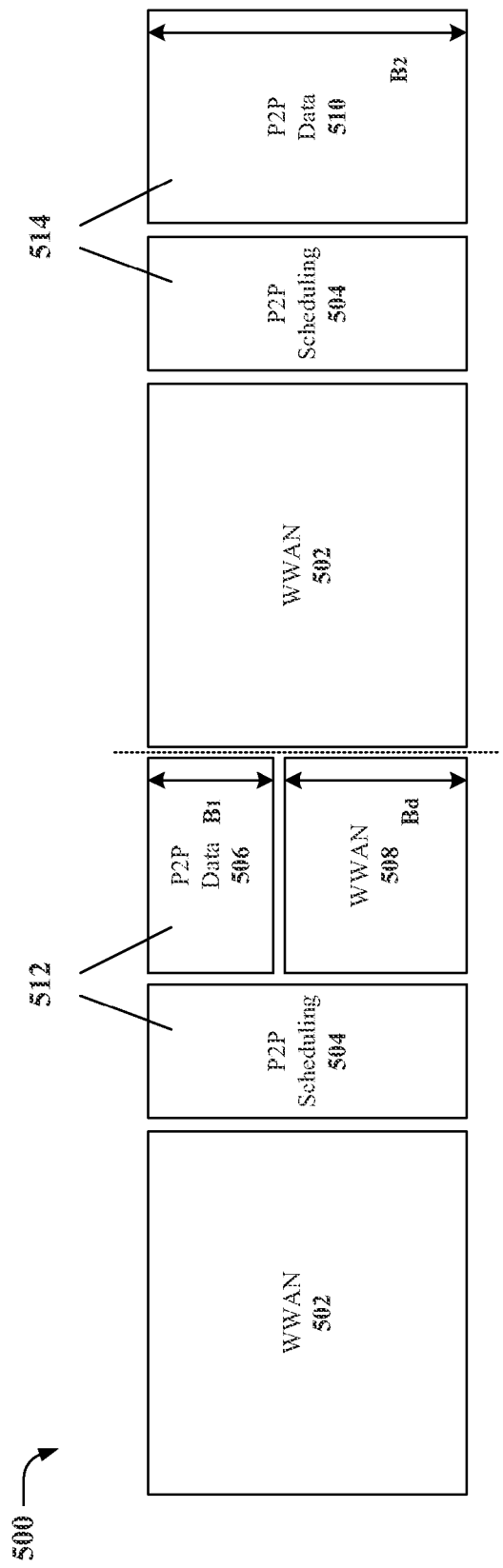
FIG. 8 is a diagram illustrating an exemplary division of WWAN and peer-to-peer resources.

FIG. 8 is a diagram 500 illustrating an exemplary division of WWAN and peer-to-peer resources. As shown in FIG. 8, peer-to-peer communication in a WWAN may be enabled by periodically allocating peer-to-peer resources 512, 514 that are orthogonal to the WWAN resources 502, 508. The resources 502, 508 do not necessarily need to be WWAN resources and may be used for other non peer-to-peer communication as discussed in relation to FIG. 9. The peer-to-peer resources 512 include peer-to-peer scheduling resources 504 used for distributed scheduling and peer-to-peer data traffic resources 506. The peer-to-peer resources 514 include peer-to-peer scheduling resources 504 used for distributed scheduling and peer-to-peer data traffic resources 510. The peer-to-peer data resources 506 are parallel in time to the WWAN resources 508. The peer-to-peer data resources 506 have a bandwidth $B_1$ and the peer-to-peer data resources 510 have a bandwidth $B_2$ greater than bandwidth $B_1$. The WWAN resources 508 have a resource bandwidth $B_d$ equal to or approximately equal to the difference between the bandwidth $B_2$ and the bandwidth $B_1$ (i.e., $B_d=B_2-B_1$ or $B_d \approx B_2-B_1$). The bandwidth $B_d$ is better utilized for WWAN communication than peer-to-peer communication when links with low SNR are assigned to the peer-to-peer data traffic resources 506, as the additional bandwidth $B_d$ (assuming a fixed transmit power P) provides only minimal gains in the data transmission rate R.

Figure 9:
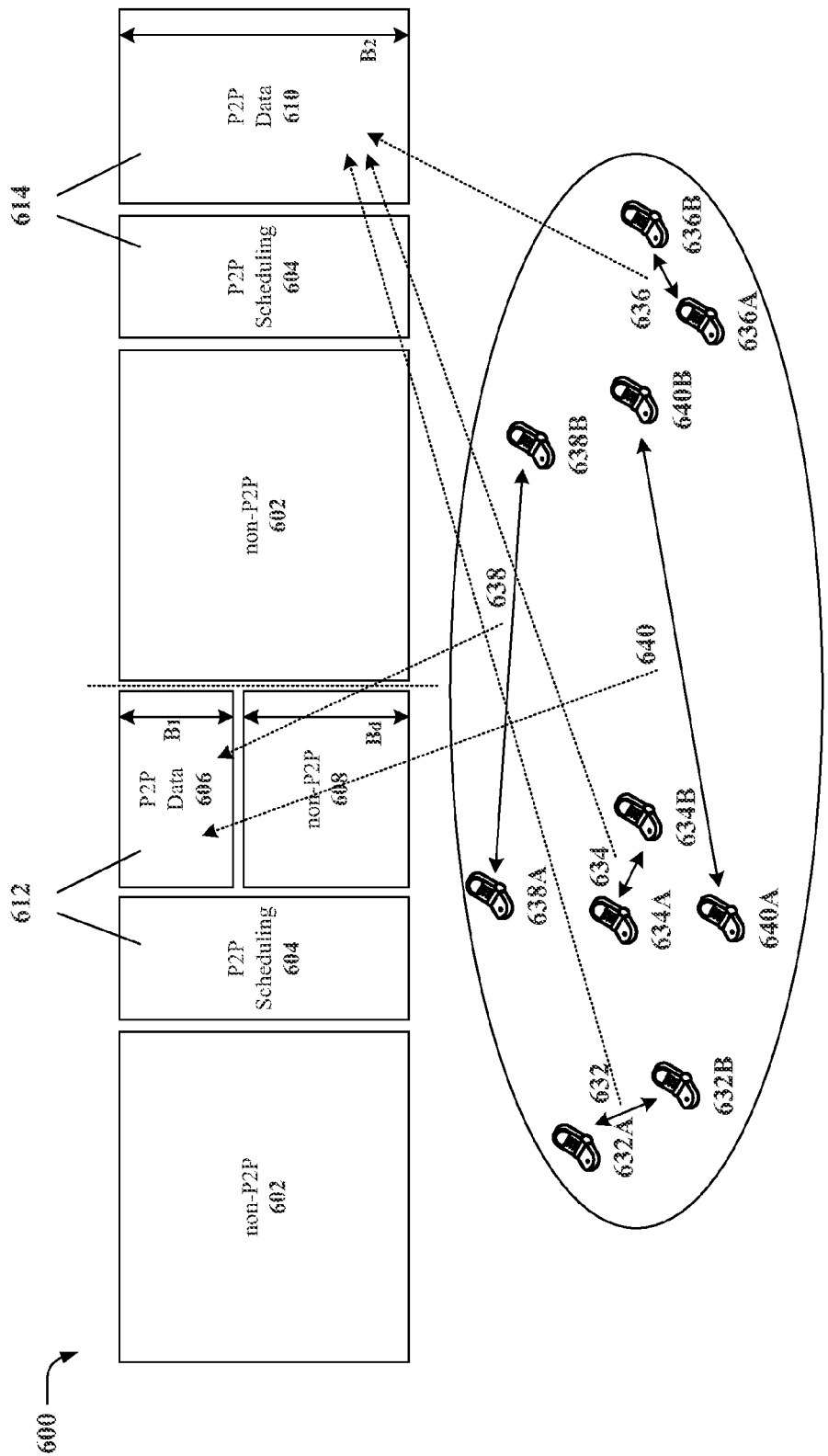
FIG. 9 is a diagram for illustrating an exemplary method.

FIG. 9 is a diagram 600 for illustrating an exemplary method. As shown in FIG. 9, peer-to-peer communication in non peer-to-peer resources may be enabled by periodically allocating peer-to-peer resources 612, 614 that are orthogonal to the non peer-to-peer resources 602, 608. The non peer-to-peer resources 602, 608 may be WWAN. The peer-to-peer resources 612 include peer-to-peer scheduling resources 604 used for distributed scheduling and peer-to-peer data traffic resources 606. The peer-to-peer resources 614 include peer-to-peer scheduling resources 604 used for distributed scheduling and peer-to-peer data traffic resources 610. The peer-to-peer data resources 606 are parallel in time to the non peer-to-peer resources 608. The peer-to-peer data resources 606 have a bandwidth $B_1$ and the peer-to-peer data resources 610 have a bandwidth $B_2$ greater than bandwidth $B_1$. The non peer-to-peer resources 608 have a resource bandwidth $B_d$ equal or approximately equal to the difference between the bandwidth $B_2$ and the bandwidth $B_1$.

The wireless devices 632A, 632B are in peer-to-peer communication in the link 632, the wireless devices 634A, 634B are in peer-to-peer communication in the link 634, the wireless devices 636A, 636B are in peer-to-peer communication in the link 636, the wireless devices 638A, 638B are in peer-to-peer communication in the link 638, and the wireless devices 640A, 640B are in peer-to-peer communication in the link 640. The links 638, 640 are assumed to have a low SNR and are shown as long links. The links 632, 634, 636 are assumed to have a high SNR and are shown as short links. Long links tend to have a lower SNR than short links due to a long distance between each of the wireless devices in the link. Short links tend to have a higher SNR than long links due to the short distance between the links. However, it is possible for long links to have a high SNR and short links to have a low SNR.

According to an exemplary method, a wireless device estimates a signal quality such as the SNR for a data transmission on the peer-to-peer data resources 606, 610. The wireless device determines whether to send the data transmission based on the signal quality and whether the resources on which the data transmission would be sent are the peer-to-peer data resources 606 or the peer-to-peer data resources

610. To determine whether to send the data transmission, the wireless device determines whether to participate in connection scheduling based on the signal quality, obtains a medium access priority when determining to participate in connection scheduling, and participates in connection scheduling based on the obtained priority. For example, the wireless device 638A may have a data transmission for the wireless device 638B and the wireless device 636A may also have a data transmission for the wireless device 636B. The wireless device 638A may estimate the SNR of a data transmission received by the wireless device 638B. The wireless device 636A may also estimate the SNR of a data transmission received by the wireless device 636B. Assume that the wireless device 636A estimates a high SNR for the data transmission to the wireless device 636B and the wireless device 638A estimates a low SNR for the data transmission to the wireless device 638B. For the peer-to-peer data resources 606, the wireless device 638A may determine to participate in connection scheduling for the peer-to-peer resources 606 based on the low estimated SNR while the wireless device 636A may determine to abstain from participating in connection scheduling for the peer-to-peer resources 606 based on the high estimated SNR. If both wireless devices 636A, 638A determine to participate in connection scheduling for the peer-to-peer resources 606, the link 638 will have a higher likelihood of obtaining a higher priority than the link 636, as the estimated SNR of the link 638 is less than the estimated SNR of the link 636. For the peer-to-peer data resources 610, the wireless device 636A may determine to participate in connection scheduling for the peer-to-peer resources 610 based on the high estimated SNR while the wireless device 638A may determine to abstain from participating in connection scheduling for the peer-to-peer data resources 610 based on the low estimated SNR. If both wireless devices 636A, 638A determine to participate in connection scheduling for the peer-to-peer data resources 610, the link 636 will have a higher likelihood of obtaining a higher priority than the link 638, as the estimated SNR of the link 636 is higher than the estimated SNR of the link 638.

Through the exemplary method, the links 638, 640 with a lower signal quality will be more likely than the links 632, 634, 636 with a higher signal quality to contend for the peer-to-peer data resources 606 and will have a greater likelihood of obtaining a higher priority than the links 632, 634, 636 for the peer-to-peer data resources 606. Further, the links 632, 634, 636 with a higher signal quality will be more likely than the links 638, 640 with a lower signal quality to contend for the peer-to-peer data resources 610 and will have a greater likelihood of obtaining a higher priority than the links 638, 640 for the peer-to-peer resources 610.

A link may determine whether to participate in connection scheduling based on a probability and the probability may be based on the estimated signal quality. For the peer-to-peer data resources 606, the probability for a lower signal quality may be greater than the probability for a higher signal quality. For example, the link 638 with a low estimated SNR may have a probability $P_1$ for participating in connection scheduling for the peer-to-peer data resources 606 and the link 636 with a high estimated SNR may have a probability $P_2$ less than $P_1$ for participating in connection scheduling for the peer-to-peer data resources 606. For the peer-to-peer data resources 610, the probability for a lower signal quality may be less than the probability for a higher signal quality. For example, the link 638 with a low estimated SNR may have a probability $P_1$ for participating in connection scheduling for the peer-to-peer data resources 610 and the link 636 with a high estimated SNR may have a probability $P_2$ greater than $P_1$ for participating in connection scheduling for the peer-to-peer data resources 610.

The obtained medium access priority may also be based on a probability. When the peer-to-peer data resources for which a link is participating in scheduling are the peer-to-peer data resources 606, the probability of obtaining a higher priority level decreases with increasing signal quality and the probability of obtaining a lower priority level increases with increasing signal quality. For example, the link 638 has a higher probability of obtaining a high priority level than the link 636 for the peer-to-peer data resources 606. When the peer-to-peer data resources for which the wireless device is participating in scheduling is the peer-to-peer data resources 610, the probability of obtaining a higher priority level increases with increasing signal quality and the probability of obtaining a lower priority level decreases with increasing signal quality. For example, the link 636 has a higher probability of obtaining a high priority level than the link 638 for the peer-to-peer data resources 610.

Figure 10:
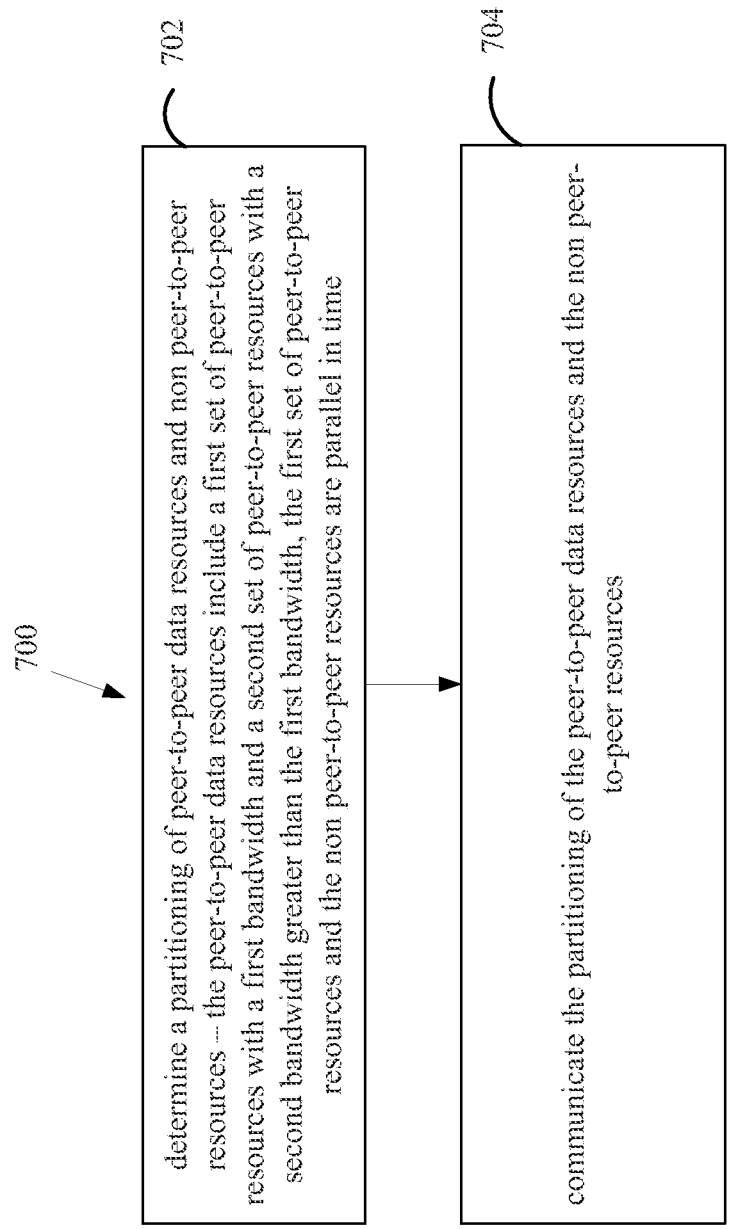
FIG. 10 is a flow chart of a first method of wireless communication.

FIG. 10 is a flow chart 700 of an exemplary method. The method is performed by a base station (e.g., base station 204). The base station 204 may determine a partitioning of peer-to-peer resources 604, 606, 610 and non peer-to-peer resources 602, 608. Specifically, the base station 204 may determine a partitioning of peer-to-peer data resources 606, 610 and non peer-to-peer resources 608 (702). The partitioning of the resources may be periodic. The non peer-to-peer resources 608 may be WWAN resources. As discussed supra, the peer-to-peer data resources 606, 610 include a first set of peer-to-peer resources 606 with a first bandwidth $B_1$ and a second set of peer-to-peer resources 610 with a second bandwidth $B_2$ greater than the first bandwidth $B_1$ (702). The first set of peer-to-peer resources 606 and the non peer-to-peer resources 608 are parallel in time (702). The base station 204 communicates the partitioning of the peer-to-peer data resources 606, 610 and the non peer-to-peer resources 608 to a wireless device (704).

Figure 11:
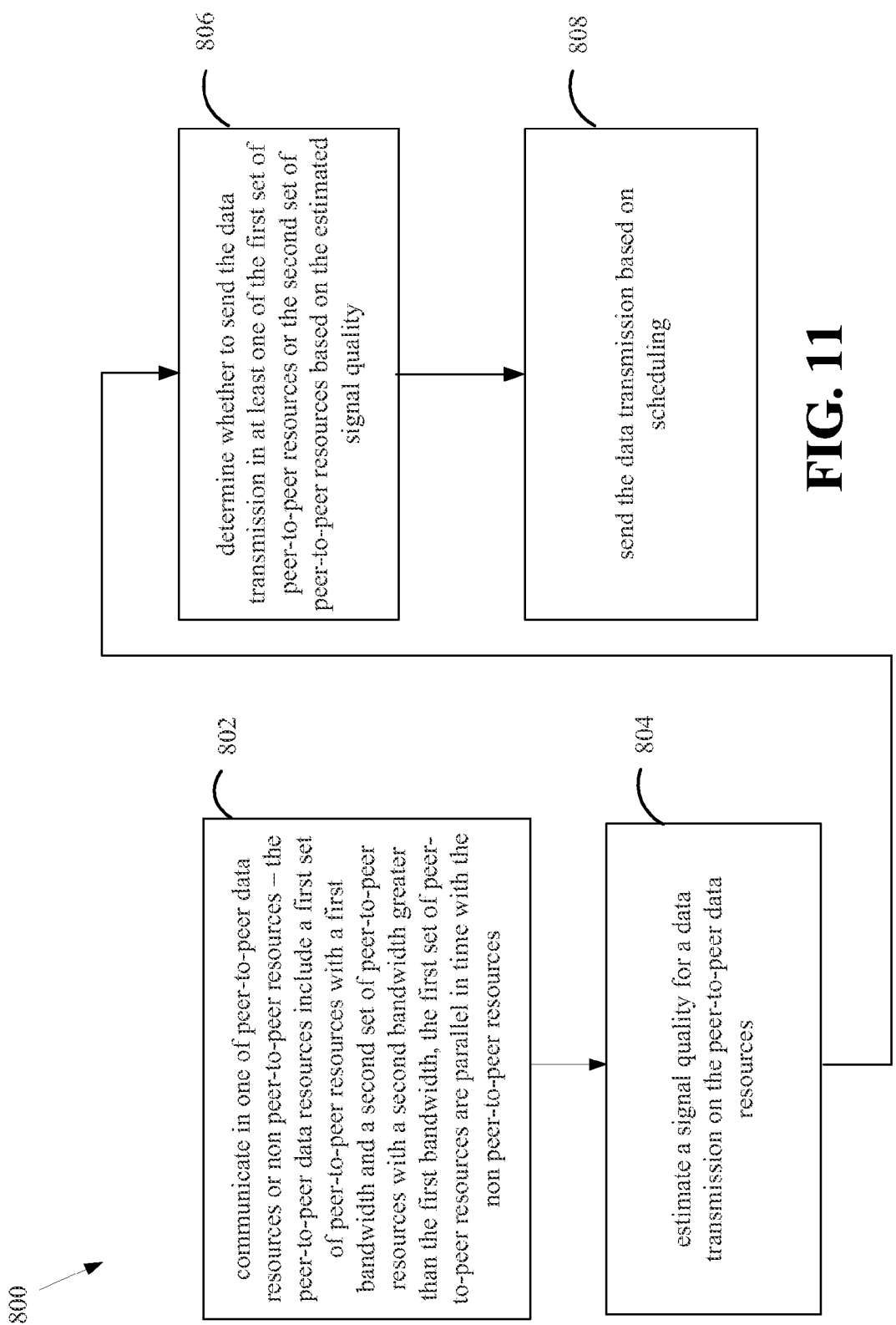
FIG. 11 is another flow chart of the first method of wireless communication.

FIG. 11 is a flow chart 800 of an exemplary method. The method is performed by a wireless device. The wireless device communicates in one of peer-to-peer data resources 606, 610 or non peer-to-peer resources 608 (802). The peer-to-peer data resources 606, 610 include a first set of peer-to-peer resources 606 with a first bandwidth $B_1$ and a second set of peer-to-peer resources 610 with a second bandwidth $B_2$ greater than the first bandwidth $B_1$ (802). The first set of peer-to-peer resources 606 is parallel in time with the non peer-to-peer resources 608 (802). In addition, the wireless device estimates a signal quality for a data transmission on the peer-to-peer data resources 606, 610 (804). Furthermore, the wireless device determines whether to send the data transmission in one of the first set of peer-to-peer resources 606 or the second set of peer-to-peer resources 610 based on the estimated signal quality (806). The wireless device sends the data transmission based on scheduling (808). The signal quality may be an SNR. The non peer-to-peer resources 608 may be WWAN resources. In one configuration, the wireless device determines whether to send the data transmission in at least one of the first set of peer-to-peer resources or the second set of peer-to-peer resources further based on information received from a base station. The information may include at least one of a priority for connection scheduling or information indicating whether to contend for the first set of peer-to-peer resources or the second set of peer-to-peer resources. For example, the wireless device may send signal quality information, such as the SNR, to the base station. The information indicating whether to contend for the first set resources or the second set of resources may then be a message indicating which of the first set of resources and/or the second set of resources to utilize. For another example, the information indicating whether to contend for the first set resources or the second set of resources may be one or more thresholds for determining whether the signal quality satisfies the threshold(s) for utilizing the peer-to-peer resources.

Figure 12:
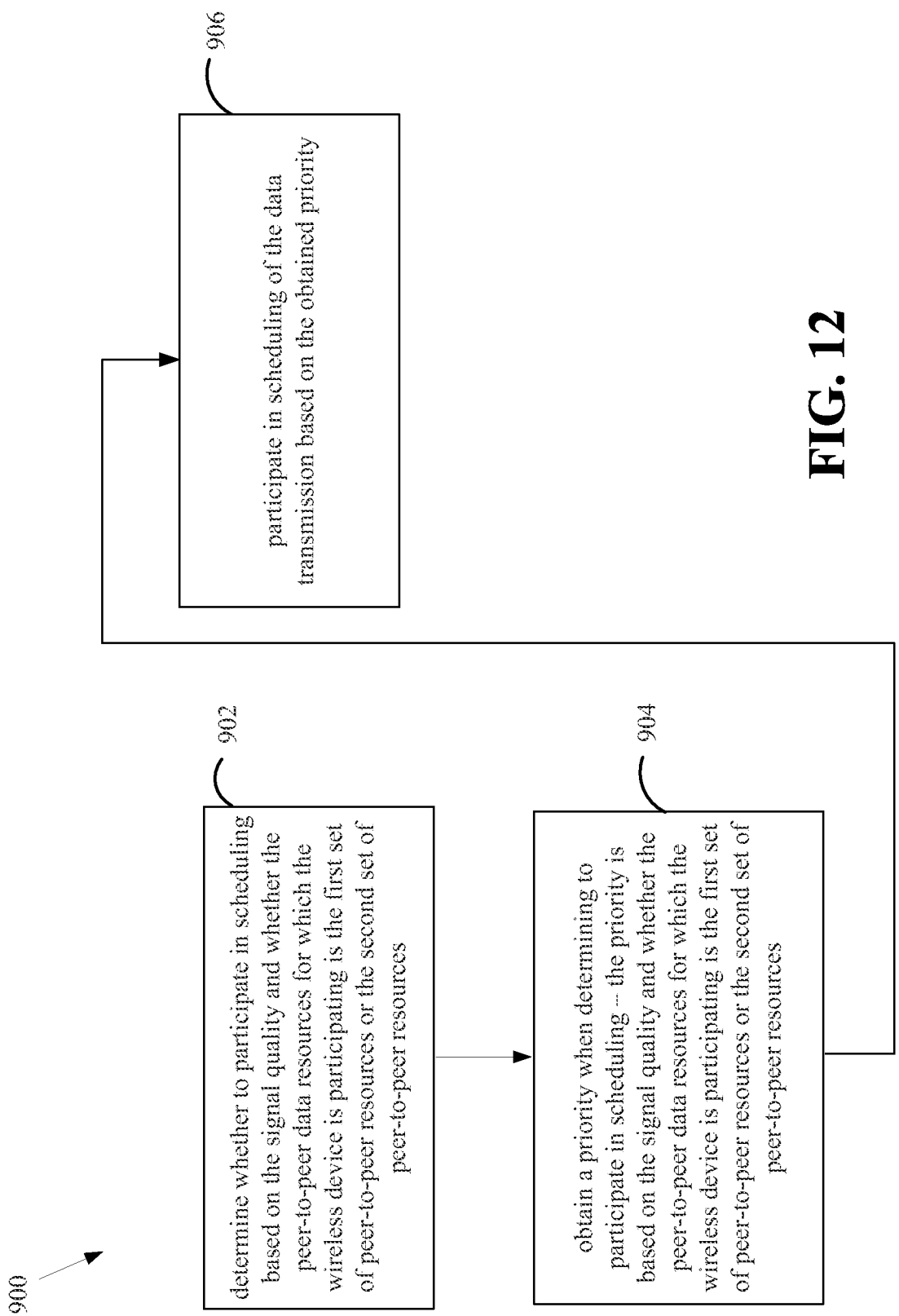
FIG. 12 is a flow chart of a second method of wireless communication.

FIG. 12 is a flow chart 900 of an exemplary method. The method is performed by a wireless device. To determine whether to send the data transmission (806), the wireless device determines whether to participate in scheduling based on the signal quality and whether the peer-to-peer data resources for which the wireless device is participating is the first set of peer-to-peer resources 606 or the second set of peer-to-peer resources 610 (902). In addition, the wireless device obtains a priority when determining to participate in scheduling (904). The priority is based on the signal quality and whether the peer-to-peer data resources for which the wireless device is participating is the first set of peer-to-peer resources 606 or the second set of peer-to-peer resources 610 (904). Furthermore, the wireless device participates in scheduling of the data transmission based on the obtained priority (906). In one configuration, when determining whether to participate in scheduling on the first set of peer-to-peer resources 606, the determining whether to participate in scheduling (902) includes participating in scheduling based on a probability. The probability for a lower signal quality is greater than the probability for a higher signal quality. In one configuration, when determining whether to participate in scheduling on the second set of peer-to-peer resources 610, the determining whether to participate in scheduling (902) includes participating in scheduling based on a probability. The probability for a lower signal quality is less than the probability for a higher signal quality. In one configuration, when the peer-to-peer data resources for which the wireless device is participating in scheduling is the first set of peer-to-peer resources 606, the obtained priority is based on a probability and the probability of obtaining a higher priority level decreases with increasing signal quality and the probability of obtaining a lower priority level increases with increasing signal quality. In one configuration, when the peer-to-peer data resources for which the wireless device is participating in scheduling is the second set of peer-to-peer resources, the obtained priority is based on a probability and the probability of obtaining a higher priority level increases with increasing signal quality and the probability of obtaining a lower priority level decreases with increasing signal quality.

Figure 13:
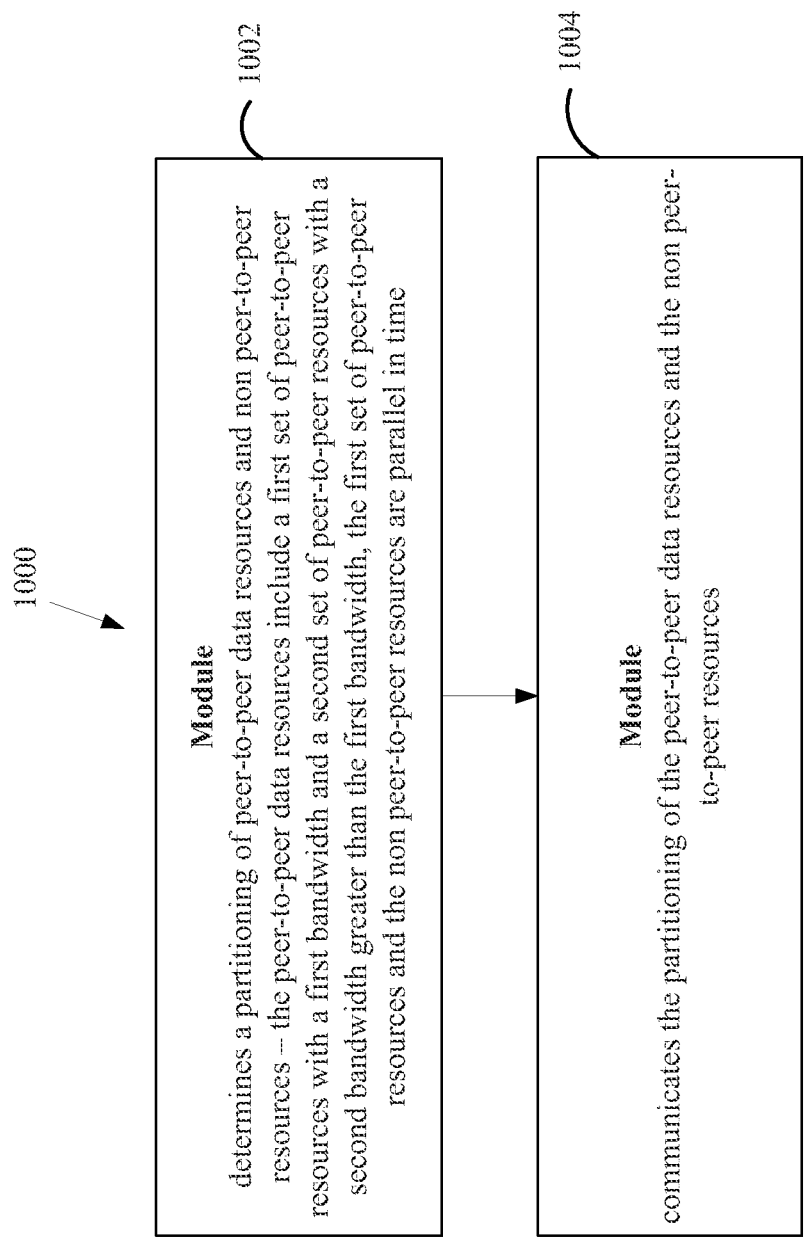
FIG. 13 is a conceptual block diagram illustrating the functionality of an exemplary apparatus.

FIG. 13 is a conceptual block diagram 1000 illustrating the functionality of an exemplary apparatus 100. The apparatus 100 may be a base station. The apparatus 100 includes a module 1002 that determines a partitioning of peer-to-peer data resources 606, 610 and non peer-to-peer resources 608. The peer-to-peer data resources 606, 610 include a first set of peer-to-peer resources 606 with a first bandwidth $B_1$ and a second set of peer-to-peer resources 610 with a second bandwidth $B_2$ greater than the first bandwidth $B_1$. The first set of peer-to-peer resources 606 and the non peer-to-peer resources 608 are parallel in time. In addition, the apparatus 100 includes a module 1004 that communicates the partitioning of the peer-to-peer data resources 606, 610 and the non peer-to-peer resources 608 to a wireless device.

Figure 14:
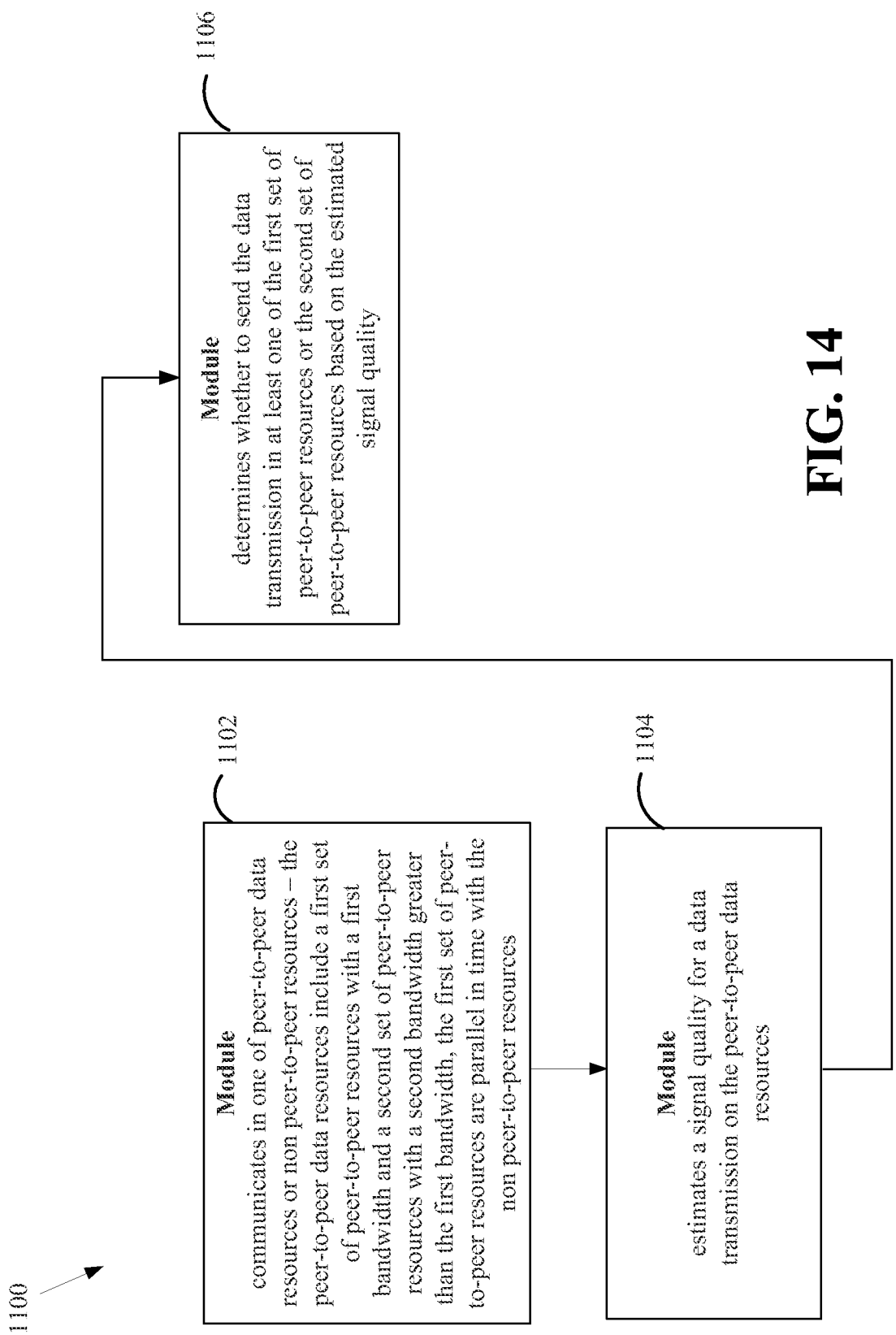
FIG. 14 is a conceptual block diagram illustrating the functionality of another exemplary apparatus.

FIG. 14 is a conceptual block diagram 1100 illustrating the functionality of an exemplary apparatus 100. The apparatus 100 may be a wireless device. The apparatus 100 includes a module 1102 that communicates in one of peer-to-peer data resources 606, 610 or non peer-to-peer resources 608. The peer-to-peer data resources 606, 610 include a first set of peer-to-peer resources 606 with a first bandwidth $B_1$ and a second set of peer-to-peer resources 610 with a second bandwidth $B_2$ greater than the first bandwidth $B_1$. The first set of peer-to-peer resources 606 is parallel in time with the non peer-to-peer resources 608. In addition, the apparatus 100 includes a module 1104 that estimates a signal quality for a data transmission on the peer-to-peer data resources 606, 610. Furthermore, the apparatus 1106 includes a module 1106 that determines whether to send the data transmission in one of the first set of peer-to-peer resources 606 or the second set of peer-to-peer resources 610 based on the estimated signal quality.

Referring to FIG. 1, in one configuration, the apparatus 100 for wireless communication, which may be a wireless device, includes means for communicating in one of peer-to-peer data resources or non peer-to-peer resources. The peer-to-peer data resources include a first set of peer-to-peer resources with a first bandwidth and a second set of peer-to-peer resources with a second bandwidth greater than the first bandwidth. The first set of peer-to-peer resources is parallel in time with the non peer-to-peer resources. In addition, the apparatus 100 includes means for estimating a signal quality for a data transmission on the peer-to-peer data resources. Furthermore, the apparatus 100 includes means for determining whether to send the data transmission in one of the first set of peer-to-peer resources or the second set of peer-to-peer resources based on the estimated signal quality. The means for determining whether to send the data transmission may include means for determining whether to participate in scheduling based on the signal quality and whether the peer-to-peer data resources for which the apparatus is participating is the first set of peer-to-peer resources or the second set of peer-to-peer resources;

means for obtaining a priority when determining to participate in scheduling, the priority being based on the signal quality and whether the peer-to-peer data resources for which the apparatus is participating is the first set of peer-to-peer resources or the second set of peer-to-peer resources; and means for participating in scheduling of the data transmission based on the obtained priority. The apparatus 100 may further include means for sending the data transmission based on the scheduling. In one configuration, when determining whether to participate in scheduling on the first set of peer-to-peer resources, the means for determining whether to participate in scheduling includes means for participating in scheduling based on a probability. In such a configuration, the probability for a lower signal quality is greater than the probability for a higher signal quality. In another configuration, when determining whether to participate in scheduling on the second set of peer-to-peer resources, the means for determining whether to participate in scheduling includes means for participating in scheduling based on a probability. In such a configuration, the probability for a lower signal quality is less than the probability for a higher signal quality. The aforementioned means is the processing system 114 configured to perform the functions recited by the aforementioned means.

In one configuration, the apparatus 100 for wireless communication, which may be a base station, includes means for determining a partitioning of peer-to-peer data resources and non peer-to-peer resources. The peer-to-peer data resources include a first set of peer-to-peer resources with a first bandwidth and a second set of peer-to-peer resources with a second bandwidth greater than the first bandwidth. The first set of peer-to-peer resources and the non peer-to-peer resources are parallel in time. In addition, the apparatus 100 includes means for communicating the partitioning of the peer-to-peer data resources and the non peer-to-peer resources. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a wireless device, comprising:
   communicating in one of peer-to-peer data resources or non peer-to-peer resources, the peer-to-peer data resources comprising a first set of peer-to-peer resources with a first bandwidth and a second set of peer-to-peer resources with a second bandwidth greater than the first bandwidth, the first set of peer-to-peer resources being parallel in time with the non peer-to-peer resources;
   estimating a signal quality for a data transmission on the peer-to-peer data resources; and
   determining whether to send the data transmission in at least one of the first set of peer-to-peer resources or the second set of peer-to-peer resources based on the estimated signal quality,
   wherein the non peer-to-peer resources are wireless wide area network (WWAN) resources.

2. The method of claim 1, wherein the signal quality is a signal to noise ratio (SNR).

3. The method of claim 1, wherein the determining whether to send the data transmission comprises:
   determining whether to participate in scheduling based on the signal quality and whether the peer-to-peer data resources for which the wireless device is participating is the first set of peer-to-peer resources or the second set of peer-to-peer resources;
   obtaining a priority when determining to participate in scheduling, the priority being based on the signal quality and whether the peer-to-peer data resources for which the wireless device is participating is the first set of peer-to-peer resources or the second set of peer-to-peer resources; and
   participating in scheduling of the data transmission based on the obtained priority.

4. The method of claim 3, further comprising sending the data transmission based on the scheduling.

5. The method of claim 3, wherein when determining whether to participate in scheduling on the first set of peer-to-peer resources, the determining whether to participate in scheduling comprises participating in scheduling based on a probability, the probability for a lower signal quality being greater than the probability for a higher signal quality.

6. The method of claim 3, wherein when determining whether to participate in scheduling on the second set of peer-to-peer resources, the determining whether to participate in scheduling comprises participating in scheduling based on a probability, the probability for a lower signal quality being less than the probability for a higher signal quality.

7. The method of claim 3, wherein when the peer-to-peer data resources for which the wireless device is participating in scheduling is the first set of peer-to-peer resources, the obtained priority is based on a probability, the probability of obtaining a higher priority level decreasing with increasing signal quality and the probability of obtaining a lower priority level increasing with increasing signal quality.

8. The method of claim 3, wherein when the peer-to-peer data resources for which the wireless device is participating in scheduling is the second set of peer-to-peer resources, the obtained priority is based on a probability, the probability of obtaining a higher priority level increasing with increasing signal quality and the probability of obtaining a lower priority level decreasing with increasing signal quality.

9. The method of claim 1, wherein the determining whether to send the data transmission in at least one of the first set of peer-to-peer resources or the second set of peer-to-peer resources is further based on information received from a base station, the information comprising at least one of a priority or information indicating whether to contend for the first set of peer-to-peer resources or the second set of peer-to-peer resources.

10. A method of wireless communication, comprising:
    determining a partitioning of peer-to-peer data resources and non peer-to-peer resources, the peer-to-peer data resources including a first set of peer-to-peer resources with a first bandwidth and a second set of peer-to-peer resources with a second bandwidth greater than the first bandwidth, the first set of peer-to-peer resources and the non peer-to-peer resources being parallel in time; and
    communicating the partitioning of the peer-to-peer data resources and the non peer-to-peer resources,
    wherein the non peer-to-peer resources are wireless wide area network (WWAN) resources.

11. The method of claim 10, wherein the partitioning is periodic.

12. An apparatus for wireless communication, comprising:
    means for communicating in one of peer-to-peer data resources or non peer-to-peer resources, the peer-to-peer data resources comprising a first set of peer-to-peer resources with a first bandwidth and a second set of peer-to-peer resources with a second bandwidth greater than the first bandwidth, the first set of peer-to-peer resources being parallel in time with the non peer-to-peer resources;
    means for estimating a signal quality for a data transmission on the peer-to-peer data resources; and
    means for determining whether to send the data transmission in at least one of the first set of peer-to-peer resources or the second set of peer-to-peer resources based on the estimated signal quality, wherein the non peer-to-peer resources are wireless wide area network (WWAN) resources.

13. The apparatus of claim 12, wherein the signal quality is a signal to noise ratio (SNR).

14. The apparatus of claim 12, wherein the means for determining whether to send the data transmission comprises:
means for determining whether to participate in scheduling based on the signal quality and whether the peer-to-peer data resources for which the apparatus is participating is the first set of peer-to-peer resources or the second set of peer-to-peer resources;
means for obtaining a priority when determining to participate in scheduling, the priority being based on the signal quality and whether the peer-to-peer data resources for which the apparatus is participating is the first set of peer-to-peer resources or the second set of peer-to-peer resources; and
means for participating in scheduling of the data transmission based on the obtained priority.

15. The apparatus of claim 14, further comprising means for sending the data transmission based on the scheduling.

16. The apparatus of claim 14, wherein when determining whether to participate in scheduling on the first set of peer-to-peer resources, the means for determining whether to participate in scheduling comprises means for participating in scheduling based on a probability, the probability for a lower signal quality being greater than the probability for a higher signal quality.

17. The apparatus of claim 14, wherein when determining whether to participate in scheduling on the second set of peer-to-peer resources, the means for determining whether to participate in scheduling comprises means for participating in scheduling based on a probability, the probability for a lower signal quality being less than the probability for a higher signal quality.

18. The apparatus of claim 14, wherein when the peer-to-peer data resources for which the apparatus is participating in scheduling is the first set of peer-to-peer resources, the obtained priority is based on a probability, the probability of obtaining a higher priority level decreasing with increasing signal quality and the probability of obtaining a lower priority level increasing with increasing signal quality.

19. The apparatus of claim 14, wherein when the peer-to-peer data resources for which the apparatus is participating in scheduling is the second set of peer-to-peer resources, the obtained priority is based on a probability, the probability of obtaining a higher priority level increasing with increasing signal quality and the probability of obtaining a lower priority level decreasing with increasing signal quality.

20. The apparatus of claim 14, wherein the means for determining whether to send the data transmission in at least one of the first set of peer-to-peer resources or the second set of peer-to-peer resources is further based on information received from a base station, the information comprising at least one of a priority or information indicating whether to contend for the first set of peer-to-peer resources or the second set of peer-to-peer resources.

21. An apparatus for wireless communication, comprising:
means for determining a partitioning of peer-to-peer data resources and non peer-to-peer resources, the peer-to-peer data resources including a first set of peer-to-peer resources with a first bandwidth and a second set of peer-to-peer resources with a second bandwidth greater than the first bandwidth, the first set of peer-to-peer resources and the non peer-to-peer resources being parallel in time; and
means for communicating the partitioning of the peer-to-peer data resources and the non peer-to-peer resources, wherein the non peer-to-peer resources are wireless wide area network (WWAN) resources.

22. The apparatus of claim 21, wherein the partitioning is periodic.

23. A computer program product in a wireless device, comprising:
a non-transitory computer-readable medium comprising code for:
communicating in one of peer-to-peer data resources or non peer-to-peer resources, the peer-to-peer data resources comprising a first set of peer-to-peer resources with a first bandwidth and a second set of peer-to-peer resources with a second bandwidth greater than the first bandwidth, the first set of peer-to-peer resources being parallel in time with the non peer-to-peer resources;
estimating a signal quality for a data transmission on the peer-to-peer data resources; and
determining whether to send the data transmission in at least one of the first set of peer-to-peer resources or the second set of peer-to-peer resources based on the estimated signal quality,
wherein the non peer-to-peer resources are wireless wide area network (WWAN) resources.

24. The computer program product of claim 23, wherein the signal quality is a signal to noise ratio (SNR).

25. The computer program product of claim 23, wherein the code for determining whether to send the data transmission comprises code for:
determining whether to participate in scheduling based on the signal quality and whether the peer-to-peer data resources for which the wireless device is participating is the first set of peer-to-peer resources or the second set of peer-to-peer resources;
obtaining a priority when determining to participate in scheduling, the priority being based on the signal quality and whether the peer-to-peer data resources for which the wireless device is participating is the first set of peer-to-peer resources or the second set of peer-to-peer resources; and
participating in scheduling of the data transmission based on the obtained priority.

26. The computer program product of claim 25, wherein the non-transitory computer-readable medium further comprises code for sending the data transmission based on the scheduling.

27. The computer program product of claim 25, wherein when determining whether to participate in scheduling on the first set of peer-to-peer resources, the code for determining whether to participate in scheduling comprises code for participating in scheduling based on a probability, the probability for a lower signal quality being greater than the probability for a higher signal quality.

28. The computer program product of claim 25, wherein when determining whether to participate in scheduling on the second set of peer-to-peer resources, the code for determining whether to participate in scheduling comprises code for participating in scheduling based on a probability, the probability for a lower signal quality being less than the probability for a higher signal quality.

29. The computer program product of claim 25, wherein when the peer-to-peer data resources for which the wireless device is participating in scheduling is the first set of peer-to-peer resources, the obtained priority is based on a probability, the probability of obtaining a higher priority level decreasing with increasing signal quality and the probability of obtaining a lower priority level increasing with increasing signal quality.

30. The computer program product of claim 25, wherein when the peer-to-peer data resources for which the wireless device is participating in scheduling is the second set of peer-to-peer resources, the obtained priority is based on a probability, the probability of obtaining a higher priority level increasing with increasing signal quality and the probability of obtaining a lower priority level decreasing with increasing signal quality.

31. The computer program product of claim 23, wherein the code for determining whether to send the data transmission in at least one of the first set of peer-to-peer resources or the second set of peer-to-peer resources is further based on information received from a base station, the information comprising at least one of a priority or information indicating whether to contend for the first set of peer-to-peer resources or the second set of peer-to-peer resources.

32. A computer program product for wireless communication, comprising:
 a non-transitory computer-readable medium comprising code for:
  determining a partitioning of peer-to-peer data resources and non peer-to-peer resources, the peer-to-peer data resources including a first set of peer-to-peer resources with a first bandwidth and a second set of peer-to-peer resources with a second bandwidth greater than the first bandwidth, the first set of peer-to-peer resources and the non peer-to-peer resources being parallel in time; and
  communicating the partitioning of the peer-to-peer data resources and the non peer-to-peer resources,
  wherein the non peer-to-peer resources are wireless wide area network (WWAN) resources.

33. The computer program product of claim 32, wherein the partitioning is periodic.

34. An apparatus for wireless communication, comprising:
 a processing system configured to:
  communicate in one of peer-to-peer data resources or non peer-to-peer resources, the peer-to-peer data resources comprising a first set of peer-to-peer resources with a first bandwidth and a second set of peer-to-peer resources with a second bandwidth greater than the first bandwidth, the first set of peer-to-peer resources being parallel in time with the non peer-to-peer resources;
  estimate a signal quality for a data transmission on the peer-to-peer data resources; and
  determine whether to send the data transmission in at least one of the first set of peer-to-peer resources or the second set of peer-to-peer resources based on the estimated signal quality,
  wherein the non peer-to-peer resources are wireless area network (WWAN) resources.

35. The apparatus of claim 34, wherein the signal quality is a signal to noise ratio (SNR).

36. The apparatus of claim 34, wherein to determine whether to send the data transmission, the processing system is configured to:
  determine whether to participate in scheduling based on the signal quality and whether the peer-to-peer data resources for which the apparatus is participating is the first set of peer-to-peer resources or the second set of peer-to-peer resources;
  obtain a priority when determining to participate in scheduling, the priority being based on the signal quality and whether the peer-to-peer data resources for which the apparatus is participating is the first set of peer-to-peer resources or the second set of peer-to-peer resources; and
  participate in scheduling of the data transmission based on the obtained priority.

37. The apparatus of claim 36, wherein the processing system is further configured to send the data transmission based on the scheduling.

38. The apparatus of claim 36, wherein to determine whether to participate in scheduling on the first set of peer-to-peer resources, the processing system is configured to participate in scheduling based on a probability, the probability for a lower signal quality being greater than the probability for a higher signal quality.

39. The apparatus of claim 36, wherein to determine whether to participate in scheduling on the second set of peer-to-peer resources, the processing system is configured to participate in scheduling based on a probability, the probability for a lower signal quality being less than the probability for a higher signal quality.

40. The apparatus of claim 36, wherein when the peer-to-peer data resources for which the apparatus is participating in scheduling is the first set of peer-to-peer resources, the obtained priority is based on a probability, the probability of obtaining a higher priority level decreasing with increasing signal quality and the probability of obtaining a lower priority level increasing with increasing signal quality.

41. The apparatus of claim 36, wherein when the peer-to-peer data resources for which the apparatus is participating in scheduling is the second set of peer-to-peer resources, the obtained priority is based on a probability, the probability of obtaining a higher priority level increasing with increasing signal quality and the probability of obtaining a lower priority level decreasing with increasing signal quality.

42. The apparatus of claim 34, wherein the processing system is configured to determine whether to send the data transmission in at least one of the first set of peer-to-peer resources or the second set of peer-to-peer resources further based on information received from a base station, the information comprising at least one of a priority or information indicating whether to contend for the first set of peer-to-peer resources or the second set of peer-to-peer resources.

43. An apparatus for wireless communication, comprising:
 a processing system configured to:
  determine a partitioning of peer-to-peer data resources and non peer-to-peer resources, the peer-to-peer data resources including a first set of peer-to-peer resources with a first bandwidth and a second set of peer-to-peer resources with a second bandwidth greater than the first bandwidth, the first set of peer-to-peer resources and the non peer-to-peer resources being parallel in time; and
  communicate the partitioning of the peer-to-peer data resources and the non peer-to-peer resources,
  wherein the non peer-to-peer resources are wireless wide area network (WWAN) resources.

44. The apparatus of claim 43, wherein the partitioning is periodic.

* * * * *